(12) United States Patent  
Nikaido

(10) Patent No.: US 8,057,049 B2  
(45) Date of Patent: Nov. 15, 2011

(54) DISPLAY METHOD AND DISPLAY DEVICE FOR DISPLAYING A DESIGN IMAGE AND A PICKUP IMAGE IN A SUPERIMPOSING MANNER, AND STORAGE MEDIUM STORING A PROGRAM FOR EXECUTING THE DISPLAY METHOD

(75) Inventor: Masafumi Nikaido, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 310 days.

(21) Appl. No.: 12/457,205

(22) Filed: Jun. 3, 2009

(65) Prior Publication Data

US 2010/0111442 A1    May 6, 2010

(30) Foreign Application Priority Data

Nov. 6, 2008 (JP) ................................. 2008-153007

(51) Int. Cl.  
*G06K 9/40* (2006.01)
(52) U.S. Cl. ........... 353/69; 353/121; 345/611; 348/746
(58) Field of Classification Search ............... 353/69, 353/70, 121; 345/611; 348/746  
See application file for complete search history.

(56) References Cited

U.S. PATENT DOCUMENTS

| | | | | |
|---|---|---|---|---|
| 4,711,544 A | * | 12/1987 | Iino et al. ........................ | 353/14 |
| 7,380,946 B1 | * | 6/2008 | Teng et al. ...................... | 353/69 |
| 7,412,113 B2 | | 8/2008 | Morichika et al. | |
| 2005/0163396 A1 | | 7/2005 | Morichika et al. | |

FOREIGN PATENT DOCUMENTS

| | | |
|---|---|---|
| JP | 10-163283 A | 6/1998 |
| JP | 2004-302756 (A) | 10/2004 |
| JP | 2004-363736 (A) | 12/2004 |

OTHER PUBLICATIONS

Notification of Reason(s) for Refusal dated Aug. 2, 2011, with English translation.

* cited by examiner

*Primary Examiner* — Seung C Sohn  
(74) *Attorney, Agent, or Firm* — McGinn IP Law Group, PLLC

(57) ABSTRACT

Provided is a display method used for a display device that displays a design image and a pickup image in a superimposing manner, including: a distortion correction process of correcting distortion of the pickup image; an alignment process of aligning a position of the design image and a position of the pickup image; and a display process of displaying the design image and the pickup image in the superimposing manner. In the distortion correction process, the distortion of the pickup image is corrected so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis. In the alignment process, the position of the design image is aligned with the position of the pickup image by carrying out at least one of right-left reversal, top-bottom reversal, shift, rotation, enlargement, and reduction, with respect to at least one of the design image and the pickup image.

20 Claims, 11 Drawing Sheets

BEFORE DISTORTION
CORRECTION

1 PICKUP IMAGE
(ANALYSIS IMAGE)

AFTER DISTORTION
CORRECTION

2 PICKUP IMAGE
(ANALYSIS IMAGE)

BEFORE CORRECTION

3 PICKUP IMAGE (ANALYSIS IMAGE)
5 CORRECTION AXIS

AFTER CORRECTION

4 PICKUP IMAGE (ANALYSIS IMAGE)
5 CORRECTION AXIS

BEFORE CORRECTION

6 SECOND CORRECTION AXIS (SECOND AXIS)
g
5

AFTER CORRECTION

6 SECOND CORRECTION AXIS (SECOND AXIS)
5

BEFORE CORRECTION

AFTER CORRECTION

BEFORE CORRECTION

AFTER CORRECTION

BEFORE CORRECTION

AFTER CORRECTION

BEFORE CORRECTION

AFTER CORRECTION

DISPLAY METHOD AND DISPLAY DEVICE FOR DISPLAYING A DESIGN IMAGE AND A PICKUP IMAGE IN A SUPERIMPOSING MANNER, AND STORAGE MEDIUM STORING A PROGRAM FOR EXECUTING THE DISPLAY METHOD

BACKGROUND OF THE INVENTION

1. Field of the Invention

The present invention relates to a display method of displaying a design image obtained from design data and a real pickup image in a superimposing manner.

2. Description of the Related Art

Conventionally, for example, in failure analysis of a large scale integrated circuit (LSI), locations that cause a failure of the LSI (candidates for a logical failure) are logically narrowed down using a failure simulator or the like. Then, the names of the candidates for the logical failure are retrieved and displayed using a layout viewer or the like, whereby the candidates for the logical failure are checked in the layout thereof.

When an LSI has a physical abnormality, failure locations can be physically narrowed down using an analysis device such as an emission microscope, an optical beam induced resistance change (OBIRCH) analysis device, a field ion beam (FIB) device, or a secondary electron microscopic (SEM) device. For example, the emission microscope is capable of acquiring an image on which heated locations are detected, whereas the OBIRCH analysis device is capable of acquiring an image on which OBIRCH reaction is detected. The SEM device and the FIB device are capable of acquiring a real image of the LSI.

When it is found that a physical abnormality discovered by the analysis device has caused a logical abnormality, the discovered physical abnormality can be determined as a cause of the failure of the LSI. Accordingly, if the layout image (design image) displaying the candidates for the logical failure and the analysis image (pickup image) obtained by the analysis device can be easily superimposed over each other, it becomes easy to specify a location of the failure. For example, JP 10-163283 A describes position alignment between a layout image and an analysis image obtained by an analysis device such as an electron beam tester.

The following analyses are given by the present invention.

When an analysis image (pickup image) is displayed and analyzed, the analysis image is sometimes distorted compared to the real image, like in a case in which the analysis image cannot be acquired from a direction vertical to the LSI, or in a case in which the image becomes blurry when photographed. Thus, there occurs a case in which the position alignment cannot be performed sufficiently with the method described in JP 10-163283 A. As an LSI becomes finer, it becomes more difficult to specify the location of a failure due to finer position displacement.

SUMMARY

According to one aspect of the present invention, a display method used for a display device that displays a design image and a pickup image in a superimposing manner includes: a distortion correction process of correcting distortion of the pickup image; an alignment process of aligning a position of the design image with a position of the pickup image; and a display process of displaying the design image and the pickup image in the superimposing manner.

In the distortion correction process, the distortion of the pickup image is corrected so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis.

In the alignment process, the position of the design image is aligned with the position of the pickup image by carrying out at least one of right-left reversal, top-bottom reversal, shift, rotation, enlargement, and reduction, with respect to at least one of the design image and the pickup image.

Further, according to another aspect of the present invention, a display device that displays a design image and a pickup image in a superimposing manner includes: a distortion correction unit for correcting distortion of the pickup image so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis; an alignment unit for aligning a position of the design image with a position of the pickup image by carrying out at least one of right-left reversal, top-bottom reversal, shift, rotation, enlargement, and reduction, with respect to at least one of the design image and the pickup image; and a display unit for displaying the design image and the pickup image in the superimposing manner.

Further, according to yet another aspect of the present invention, a program causes a computer that is included in a display device to execute the above-mentioned display method, or causes a computer to function as the above-mentioned display device.

According to the present invention, in displaying the design image and the pickup image in the superimposing manner, even if the pickup image is distorted as in a case where the pickup image has not been photographed from a position perpendicular thereto or a case where the image has become blurry when photographed, it is possible to easily align the position of the pickup image with the position of the design image.

BRIEF DESCRIPTION OF THE DRAWINGS

The above and other objects, advantages and features of the present invention will be more apparent from the following description of certain preferred modes taken in conjunction with the accompanying drawings, in which.

DETAILED DESCRIPTION OF THE PREFERRED EMBODIMENTS

The present invention is now described herein with reference to illustrative embodiments. Those skilled in the art would recognize that many alternative embodiments can be accomplished using the teachings of the present invention and that the present invention is not limited to the embodiments illustrated for explanatory purposes.

The method according to a first embodiment of the present invention is described with reference to the attached drawings.

A display method used for a display device that displays a design image and a pickup image in a superimposing manner according to one embodiment of the present invention includes a distortion correction process of correcting distortion of the pickup image, an alignment process of aligning positions of the design image and the pickup image, and a display process of displaying the design image and the pickup image in a superimposing manner.

The above-mentioned distortion correction process includes processing that corrects the distortion of the pickup image so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis. The above-mentioned processing includes processing of correcting, for example, a quadrangle a-b-c-d of FIG. 3A into a quadrangle a'-b'-c'-d'. More specifically, the processing is disclosed in FIG. 6A to FIG. 16.

Further, the above-mentioned alignment process of aligning the positions of the design image and the pickup image includes processing that aligns the positions of the design image and the pickup image by carrying out at least one of right-left reversal, top-bottom reversal, shift, rotation, enlargement, and reduction, with respect to at least one of the design image and the pickup image.

In the alignment process, based on three points specified on the design image and three points specified on the pickup image in a corresponding manner thereto, it is judged whether or not the pickup image is reversed front to back with respect to the design image. In a case where the pickup image is reversed front to back with respect to the design image, the alignment process may include processing that corrects the front-back reversal by carrying out the right-left reversal or the top-bottom reversal with respect to the design image or the pickup image.

Figure 4B:
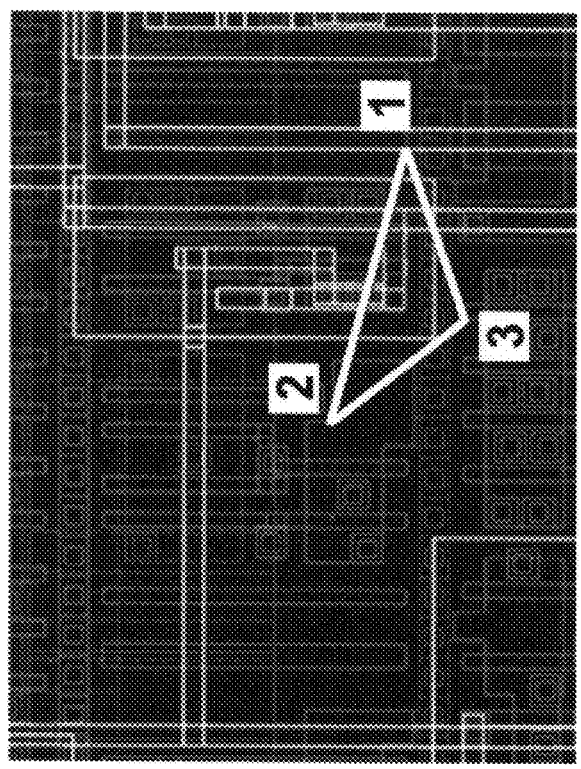
FIGS. 4A and 4B are an example of alignment points specified in a position alignment process according to the one embodiment of the present invention.

For example, there is a case in which an LSI is mounted by a flip-chip method, or a case in which an analysis image has to be acquired from the back side of the LSI so that detection signals are not affected by the upper-layer wiring. In such a case, unless the layout image is reversed front to back before the layout image is superimposed over the analysis image, it is impossible to acquire a superimposed image having the same direction as that of the image viewed at the time of the analysis. For this case, regardless of whether the pickup image has been photographed from the front side or the back side, by specifying three points on the design image and also specifying three points on the pickup image in a corresponding manner thereto, it is possible to automatically judge whether or not the design image and the pickup image are reversed front to back with respect to each other, enabling the directions of the design image and the pickup image to be matched automatically. Specifically, based on three points (1, 2, and 3) specified on the design image (layout image) of FIG. 4B and three points (1', 2', and 3') specified on the pickup image (analysis image) in a corresponding manner thereto, it is judged whether or not the pickup image is reversed front to back with respect to the design image. In a case where the pickup image is reversed front to back with respect to the design image, the design image or the pickup image is reversed right to left or top to bottom, whereby the positions thereof can be aligned. It should be noted that the alignment process may be automatically performed except for the specifying of the three points, but an operator may input an instruction when necessary.

Figure 5:
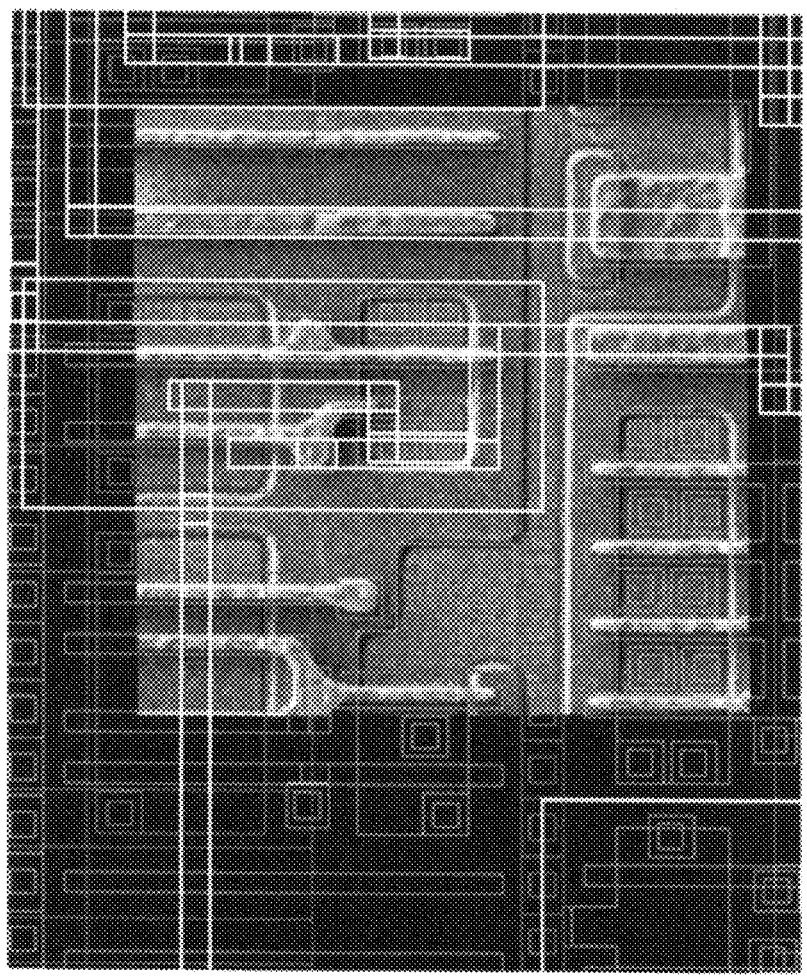
FIG. 5 is an example of displaying the design image and the pickup image in a superimposing manner according to the one embodiment of the present invention.

Further, the display process of displaying the design image and the pickup image in a superimposing manner includes processing that displays, in a superimposing manner, the design image and the pickup image for which the distortion has been corrected and the position thereof has been aligned with the position of the design image in the above-mentioned distortion correction process and alignment process, respectively. FIG. 5 illustrates an example of the superimposed image displayed. Around the perimeter of FIG. 5, only the design image is displayed, and at the center portion of FIG. 5, the pickup image is superimposed over the design image and displayed.

Figure 1:
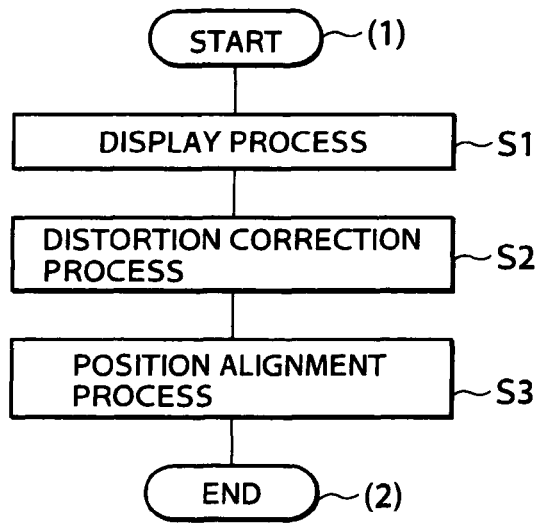
FIG. 1 is a flow chart illustrating processing steps of a display method of displaying a design image and a pickup image in a superimposing manner according to one embodiment of the present invention.

It should be noted that the above-mentioned display process may also include processing that superimposes the pickup image over the design image and displays the resultant image before the distortion correction or the alignment, as long as an image for which the distortion has been corrected and the positions are aligned is eventually displayed. Accordingly, as illustrated in FIG. 1, the display process may be performed prior to the distortion correction process and the position alignment process.

Hereinbelow, based on embodiments, a detailed description is given with reference to the attached drawings.

First Embodiment

[Overall Processing]

First, a description is given of a flow of overall processing of a display method used for a display device that displays a design image and a pickup image in a superimposing manner according to a first embodiment of the present invention. FIG. 1 is a flow chart illustrating processing steps of the display method used for the display device that displays the design image and the pickup image in a superimposing manner according to the first embodiment of the present invention. In FIG. 1, first, the design image and the pickup image are displayed in a superimposing manner (display process S1). At this stage, when the pickup image is distorted, distortion correction is performed for the pickup image (distortion correction process S2).

Figure 3A:
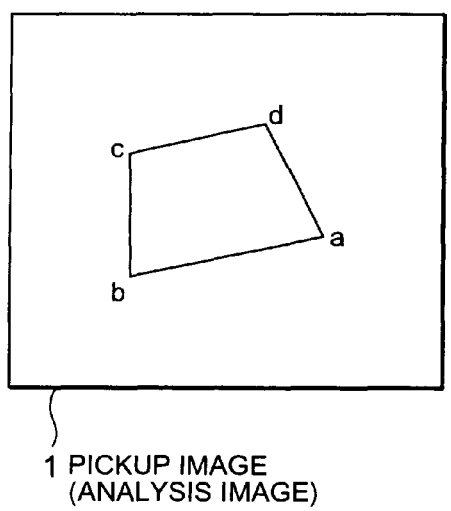
FIGS. 3A and 3B are an example of correction of the pickup image performed in a distortion correction process according to the one embodiment of the present invention.
Figure 3B:
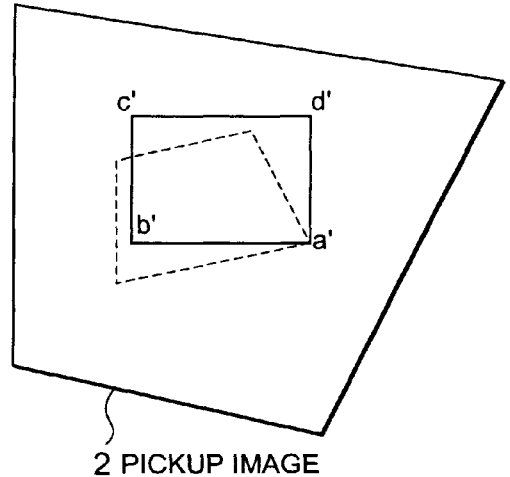

In the distortion correction, as illustrated in FIG. 3A, which is a drawing of before the distortion correction, four points are specified on the pickup image, which correspond to four points on the design image which are connected to form a rectangular in parallel with the vertical axis and the horizontal axis. In layout designing of a semiconductor integrated circuit, wiring and gates are normally arranged or wired in the directions of the vertical axis and the horizontal axis. Accordingly, in a case where a target pickup image is a pickup image of a semiconductor integrated circuit, an operator can easily recognize the directions of the vertical axis and the horizontal axis on the design image by seeing the arrangement and wiring directions of the wiring and the gates. Thus, it is also easy to specify, on the pickup image, the four points corresponding to the four points on the design image which are connected to form a rectangular in parallel with the vertical axis and the horizontal axis. In the distortion correction process, the distortion of the pickup image is corrected so that a quadrangle (a-b-c-d of FIG. 3A) having the four points thus specified on the pickup image becomes the rectangular (a'-b'-c'-d' of FIG. 3B) in parallel with the vertical axis and the horizontal axis on the pickup image.

Figure 4A:
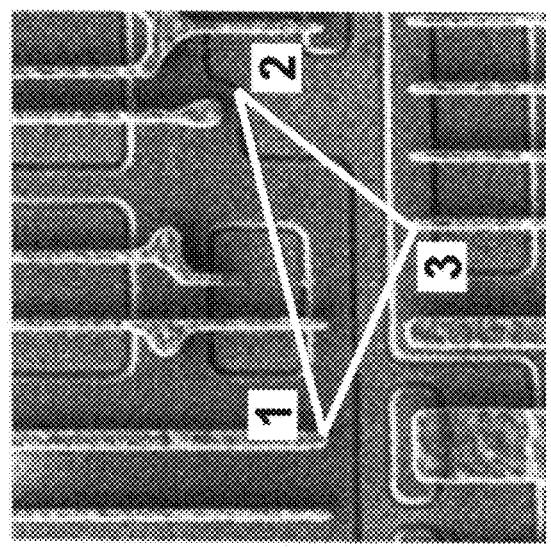

Further, in addition to the above-mentioned distortion correction process, alignment for aligning the position of the design image with the position of the pickup image is performed (position alignment process S3). In this position alignment, three arbitrary points (for example, "1", "2", and "3" of FIG. 4B) that are not on an identical straight line on the design image (layout image) are specified. Further, three points (for example, "1'", "2'", and "3'" of FIG. 4A) indicating the same positions as the respective three points described above are specified on the pickup image (analysis image). The order in which those three points are specified is the same for the cases of the design image and the pickup image. By judging whether those three points have been specified in clockwise order or counterclockwise order, and whether or not the orders of those specified three points coincide with each other between the design image and the pickup image, it is judged whether or not the design image and the pickup image are reversed front to back with respect to each other. For example, in the design image of FIG. 4B, the three points are specified in the counterclockwise order of "1", "2", and "3", whereas in the pickup image of FIG. 4A, the three points are specified in the clockwise order of "1'", "2'", and "3'". Accordingly, it is possible to automatically determine that the design image and the pickup image are reversed front to back with respect to each other. In this case, any one of the design image and the pickup image is reversed right to left or top to bottom, and then, further, the position alignment is performed. FIG. 5 is obtained in the following manner. The pickup image of FIG. 4A is reversed right to left, and then the design image or the pickup image is shifted in the horizontal direction and in the vertical direction. Then, the positions of the design image and the pickup image are aligned with each other through enlargement or reduction. Here, it should be noted that the same result can be obtained by reversing the pickup image top to bottom and rotating the resultant pickup image by 180 degrees, instead of reversing the pickup image right to left. In FIG. 5, the design image is displayed all over FIG. 5, whereas the pickup image is displayed only in a central part of FIG. 5 in a superimposing manner.

It should be noted that the correction for matching the front/back sides of the design image and the pickup image can be made by performing top-bottom reversal or right-left reversal only once with respect to any one of the design image and the pickup image. Further, in the position alignment process, for other purposes than matching the front/back-sides, the top-bottom reversal and the right-left reversal may be performed instead of the rotation of 180 degrees.

Eventually, the distortion of the pickup image is corrected, and the positions of the design image and the pickup image are aligned with each other to display a superimposed image as illustrated in FIG. 5. Then, the processing is ended.

[Use of Cross Cursor]

Here, when vertexes or correction axes of the quadrangle are specified in the distortion correction process, and when alignment points are specified in the position alignment process, the specifying is performed with cross cursors displayed, which are lines in parallel with the horizontal and vertical directions of the design image. With this configuration, it is possible to accurately specify the alignment points on the design image. Further, it becomes possible to easily recognize the alignment points of the pickup image, which correspond to the alignment points of the design image. Further, when the correction axes are specified, the specifying is performed while cross cursors in the horizontal and vertical directions of the design image are displayed, and hence it becomes possible to easily recognize a displacement of the correction axis from the horizontal or vertical direction.

Figure 12:
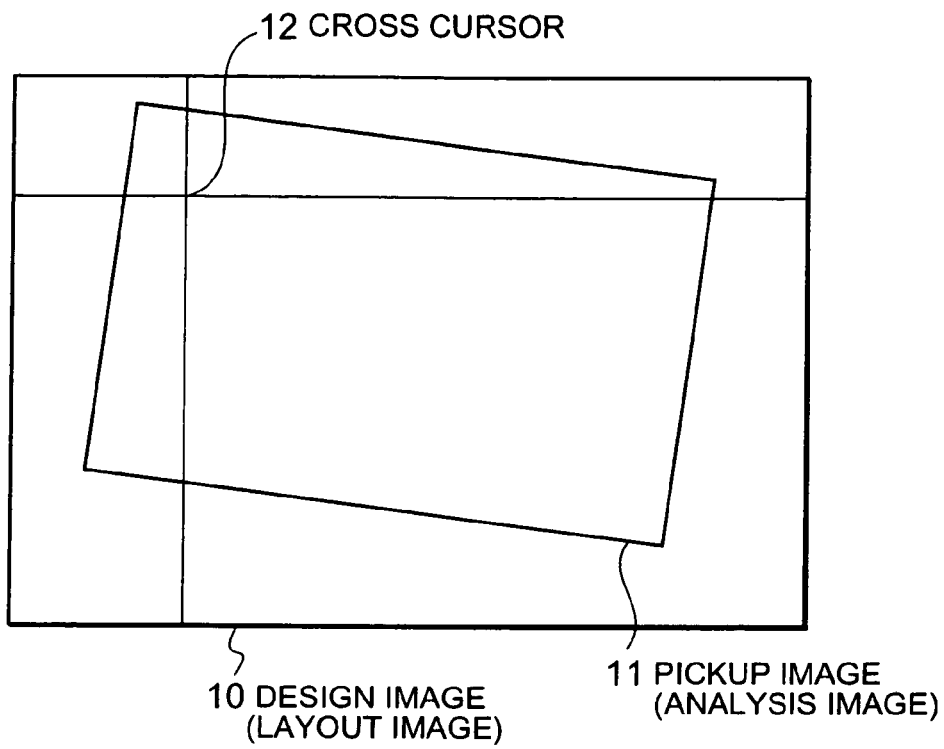
FIG. 12 is an example of a cross cursor according to the one embodiment of the present invention.
Figure 13:
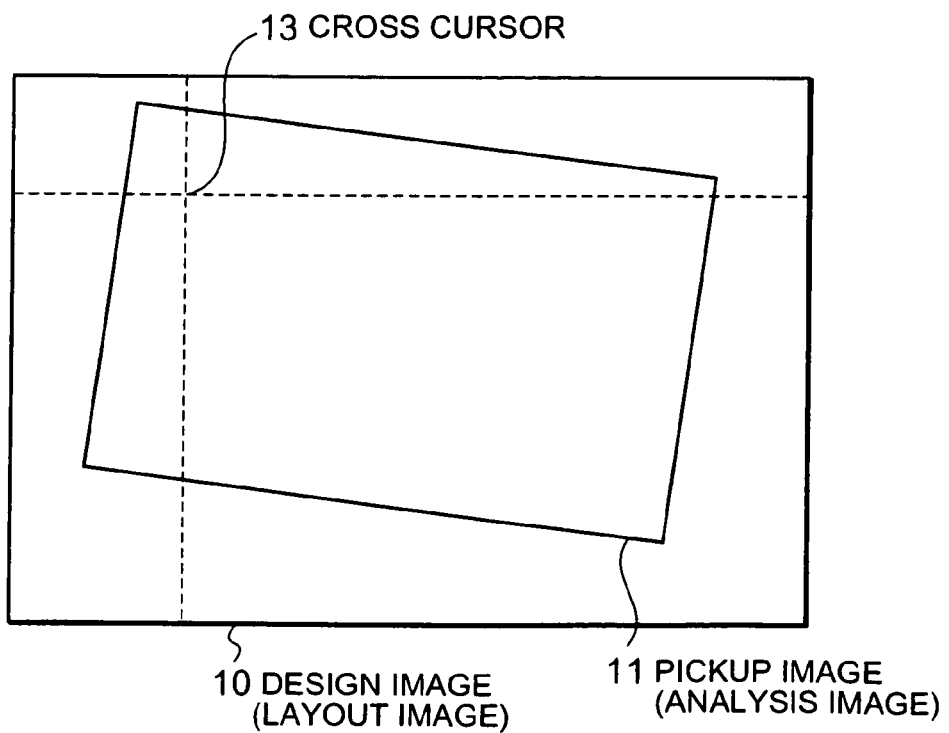
FIG. 13 is another example of the cross cursors according to the one embodiment of the present invention.
Figure 14:
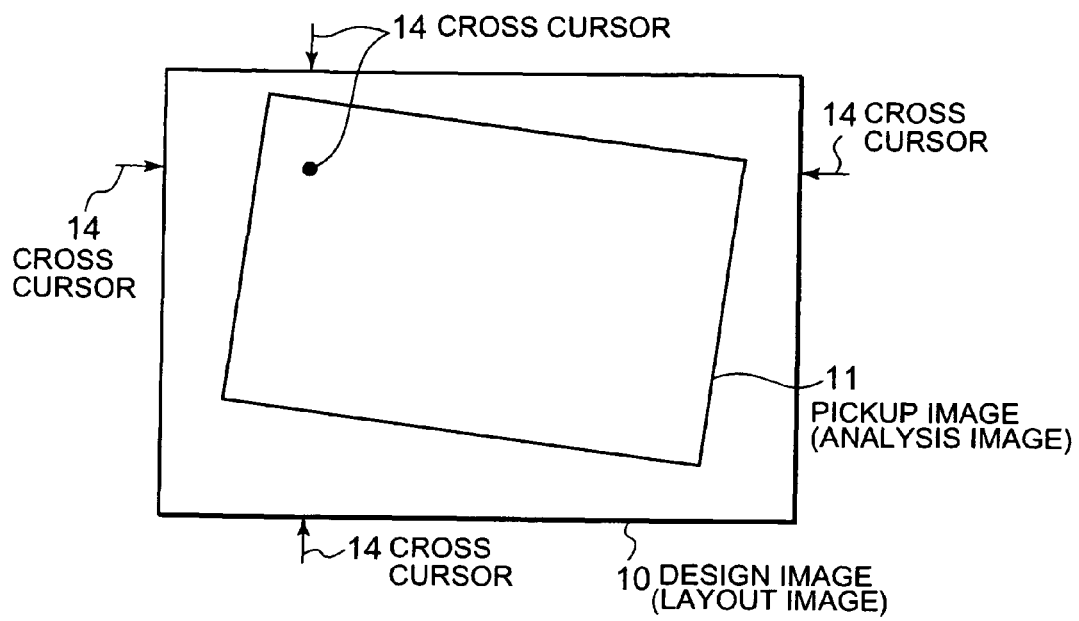
FIG. 14 is yet another example of the cross cursors according to the one embodiment of the present invention.

Some examples of the cross cursors are illustrated in FIGS. 12, 13, and 14. The cross cursor is displayed by a line in parallel with the vertical or horizontal axis of the design image. The cross cursor is such a line as a solid line or a dotted line, and the color thereof can be changed into an easily-identifiable color. In FIG. 12, a cross cursor 12 is displayed by an intersection of a vertical line and a horizontal line on the screen. In FIG. 13, cross cursors 13 are displayed by dotted lines. Further, in FIG. 14, cross cursors 14 are displayed by four arrows and an intersection thereof.

[Details of Distortion Correction]

Next, details of the distortion correction are described with reference to FIGS. 6 to 11, and FIGS. 15 to 17. The distortion correction process according to this embodiment includes four axis correction processes at the most. In each of the axis correction processes, two points are first specified on the pickup image to determine a straight line passing through those two points as a correction axis, and then the correction axis is rotated or shifted to become in parallel with the vertical axis or the horizontal axis of the design image, whereby the distortion correction is performed.

(First Distortion Correction Process)

Figure 6A:
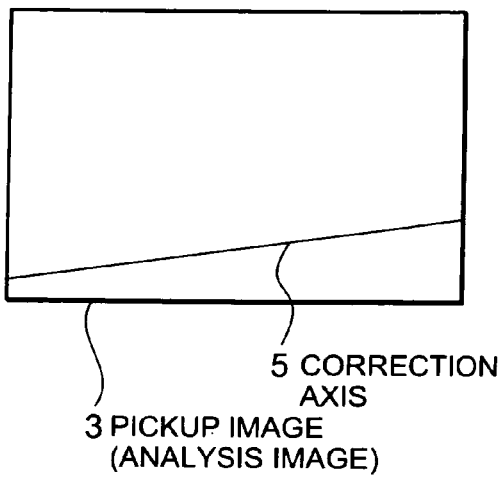
FIGS. 6A and 6B are an example of a first distortion correction process according to the one embodiment of the present invention.
Figure 6B:
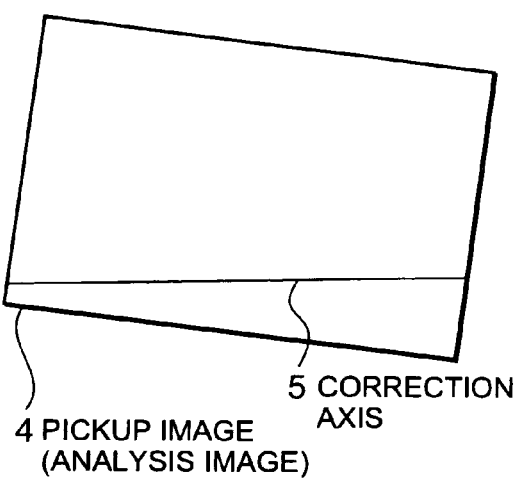

In first axis correction, as illustrated in FIGS. 6A and 6B, the pickup image is rotated, with one point on the straight line passing through specified two points as the center, so that a correction axis 5 becomes vertical or horizontal. With regard to the specifying of those two points, two points that have a horizontal or vertical positional relation therebetween on the design image are specified using the cross cursor on the pickup image. In a case where the pickup image is of a layout pattern of an LSI, two points that have the horizontal or vertical positional relation therebetween on the design image can be easily recognized on the basis of the arrangement of the wiring and gates. It should be noted that, if the pickup image has no distortion, the distortion correction process can be ended after the first distortion correction process alone.

(Second Distortion Correction Process)

Figure 7A:
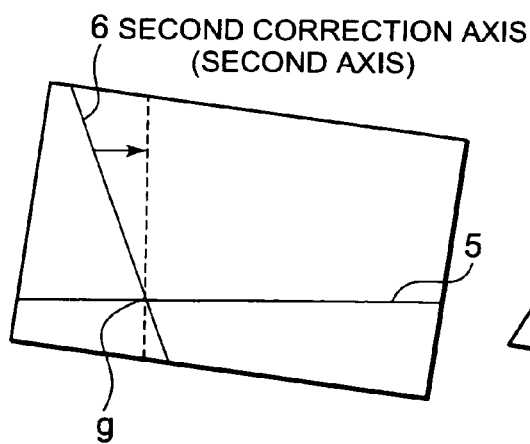
FIGS. 7A and 7B are an example of a second distortion correction process according to the one embodiment of the present invention.
Figure 7B:
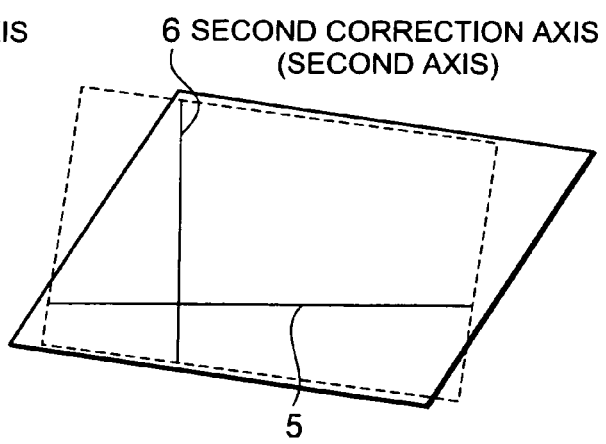

In second axis correction, when a second correction axis (hereinbelow, referred to as second axis) intersects with the first correction axis (hereinbelow, referred to as first axis) in the pickup image, as illustrated in FIGS. 7A and 7B, the pickup image is parallel-shifted and/or rotated, with an intersection g of the first axis 5 and the second axis 6 as the center, in a direction in parallel with a first axis 5 so that a second axis 6 and the first axis 5 become perpendicular to each other.

In the case of the parallel shift, the entire pickup image is shifted in the direction in parallel with the first axis so that the second axis 6 becomes perpendicular to the first axis 5. The distance of the parallel shift is, as can be easily understood from FIGS. 7A and 7B, in proportion to the distance from the first axis.

Figure 15:
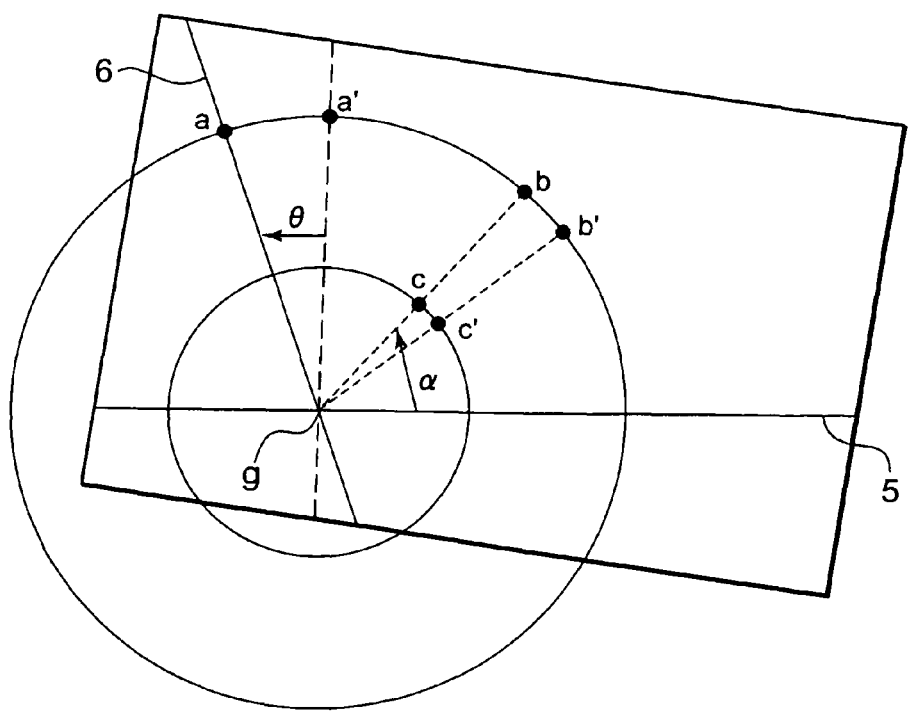
FIG. 15 is an example of correction performed by rotation in the second distortion correction process according to the one embodiment of the present invention.
Figure 16:
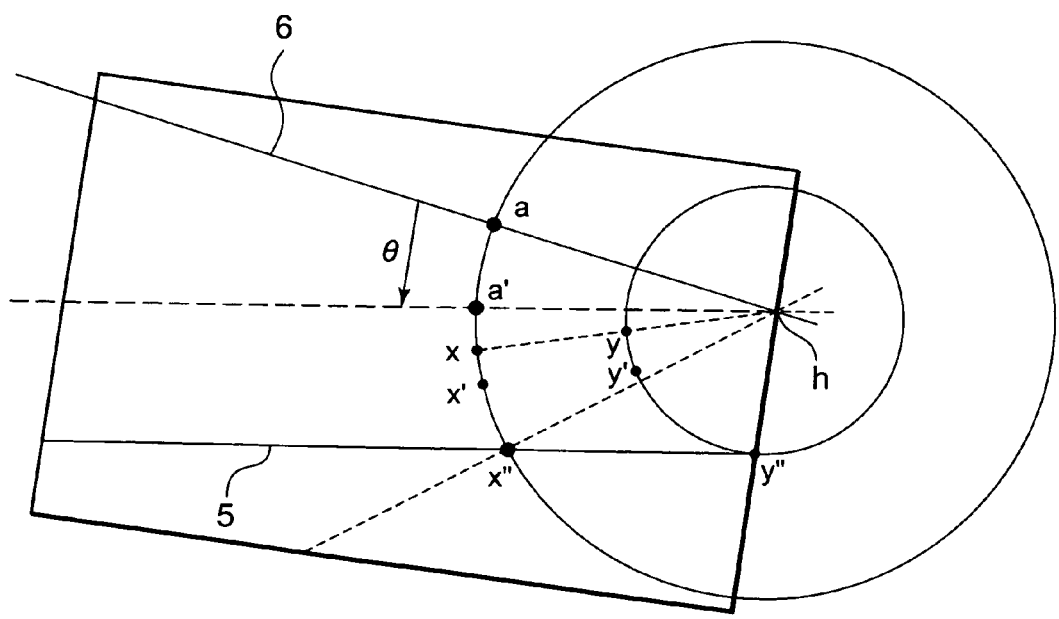
FIG. 16 is another example of the correction performed by the rotation in the second distortion correction process according to the one embodiment of the present invention.

The case in which the pickup image is rotated so that the second axis 6 becomes perpendicular to the first axis 5 is described with reference to FIG. 15. θ is set as an angle by which the second axis is rotated, with the intersection g of the first axis 5 and the second axis 6 as the center, to make the first axis 5 and the second axis 6 perpendicular to each other. Further, with regard to the coordinates of each point of the pickup image, α is set as an angle between the first axis and the each point expressed in polar coordinates with the point g as the center and the direction of the first axis set as 0°. Then, the each point of the pickup image is rotated by α*θ/(90°+θ) with the point g as the center. Specifically, in FIG. 15, points b and c are rotationally shifted to points b' and c', respectively.

It should be noted that, in a strict sense, the coordinates of the pickup image after the correction are not identical between the case of the parallel shift and the case of the rotation, but the difference presents no problem for practical application as long as the distortion is not significantly large. Further, with regard to the selection between the parallel shift and the rotational shift, for example, one of the parallel shift and the rotational shift may be selected as a default setting for a display device, and the other may be selected as an option. Further, it is also possible to use the parallel shift and the rotation in combination, in which the second axis is rotationally shifted by half the required angle, and then is parallel-shifted for the rest.

Figure 8A:
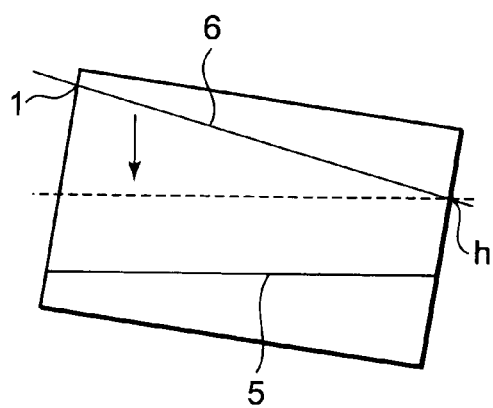
FIGS. 8A and 8B are another example of the second distortion correction process according to the one embodiment of the present invention.
Figure 8B:
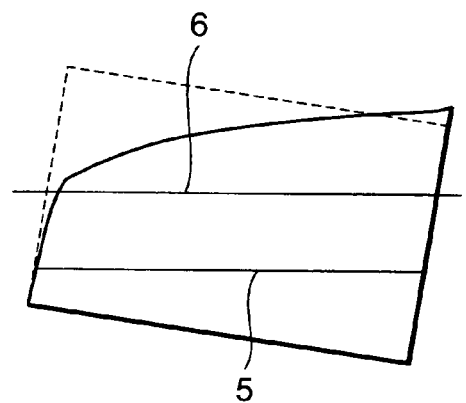

Next, in a case where the second axis 6 does not intersect with the first axis 5 in the pickup image, as illustrated in FIGS. 8A and 8B, an intersection h, which is the closer to the first axis of intersections i and h of the second axis 6 and the boundaries of the pickup image, is set as the center of the shift. Then, an area on the second axis 6 side of two areas obtained by dividing the pickup image with the first axis 5 is shifted, in a direction perpendicular to the first axis by the amount proportional to the distance from the first axis so that the second axis and the first axis become in parallel with each other. Further, the amount of the shift is also proportional to a distance from a normal drawn from the intersection h to the first axis 5.

As a result, the area on the second axis 6 side of the two areas obtained by dividing the pickup image with the first axis 5 is compressed or extended in the direction perpendicular to the first axis 5 in proportion to the distance from the above-mentioned normal.

Further, in the above-mentioned shift of the pickup image when the second axis 6 does not intersect with the first axis 5 in the pickup image, it is also possible to rotate the pickup image with the point h as the center, instead of performing the parallel shift in the direction perpendicular to the first axis 5. This rotational shift is described with reference to FIG. 16. First, θ is set as an angle by which the second axis 6 is rotated with the point h as the center until the second axis 6 becomes in parallel with the first axis 5. Next, with respect to each point of the pickup image, polar coordinates with the point has the center are conceived. Then, assuming that a point x is a target point of a shift on the pickup image, a circle having a distance from the point h to the point x as its radius and having the point h as its center is conceived. The intersection of this circle and the first axis 5 is set as x". Then, the angle by which the point x is rotated with the point h as the center can be obtained with the following equation.

$$\angle xhx' = \theta \cdot \angle xhx'' / \angle ahx''$$ Equation (1)

It should be noted that ∠xhx' represents a shift angle by which the point x is shifted with the point h as the center. Further, ∠xhx" represents an angle between a straight line connecting the point x and the point h and a straight line connecting the point x" and the point h. Further, ∠ahx" represents an angle between the straight line connecting the point x" and the point h and the second axis 6.

Here, in a case where a point of the shift target of the pickup image (point y, for example) is close to the point h and where a circle having the distance between the points h and y as its radius and having the point h as its center does not intersect with the first axis 5, calculation may be performed by replacing, in Equation (1), the point x" with an intersection (y" of FIG. 16) of the boundary of the pickup image and the first axis 5.

In the above-mentioned case, similarly to the case in which the second axis intersects with the first axis, the selection between the parallel shift and the rotation can be made freely, and both the parallel shift and the rotation can be used in combination as well.

Further, the second axis is specified with the cross cursor on the pickup image by specifying, on the design image, an axis that is perpendicular to or in parallel with the first axis. With the second axis correction described above, if the distortion is reduced to an extent that presents no problem for practical application, the distortion correction may be ended after the second axis correction.

(Case 1 for Third Distortion Correction Process: a Third Axis is Perpendicular to the First Axis and the Second Axis)

Figure 10A:
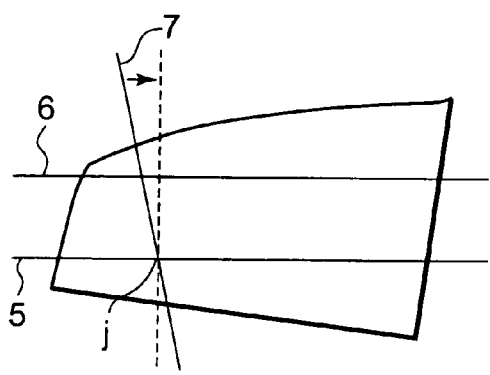
FIGS. 10A and 10B are another example of the third distortion correction process according to the one embodiment of the present invention.
Figure 10B:
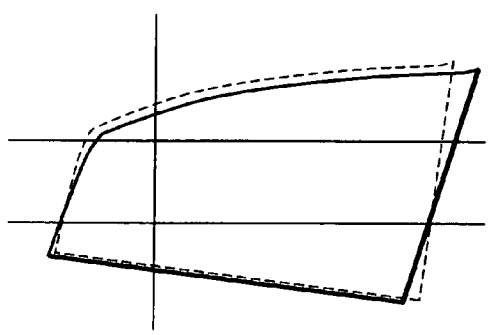

In third axis correction, in a case where the first axis 5 and the second axis 6 are in parallel with each other, as illustrated in FIGS. 10A and 10B, the pickup image is parallel-shifted, with an intersection j of a third correction axis 7 (hereinbelow, referred to as third axis) and the first axis 5 (or second axis 6) as the center, in a direction in parallel with the first axis 5 so that the third axis 7 becomes perpendicular to the first axis 5 (or second axis 6). Here, whether the intersection j of the third axis 7 and the first axis 5 is to be selected or the intersection of the third axis 7 and the second axis 6 is to be selected can be selected freely. An operator may make the selection, or alternatively, the display device may automatically make the selection. It should be noted that, also in the third axis correction, it is possible to rotate the pickup image instead of the parallel shift or in combination with the parallel shift. In the case of the rotation, in FIGS. 10A and 10B, an area of the pickup image sandwiched between the first axis 5 and the second axis 6 has only to be rotated with the intersection j of the first axis 5 and the third axis 7 as the center.

(Case 2 for Third Distortion Correction Process: the Third Axis is in Parallel with One of the First and Second Axes, and is Perpendicular to the Other)

Figure 9A:
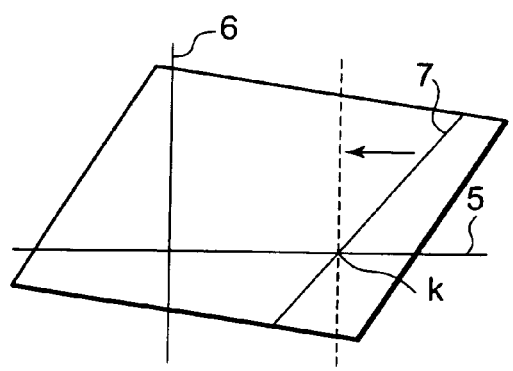
FIGS. 9A and 9B are an example of a third distortion correction process according to the one embodiment of the present invention.
Figure 9B:
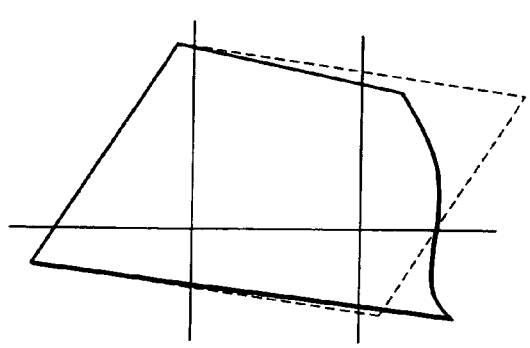

In the third axis correction, in a case where the first axis 5 is perpendicular to the second axis 6 and where the third axis 7 intersects with the first axis 5 (or second axis 6) in the pickup image, as illustrated in FIGS. 9A and 9B, an area on the third axis 7 side of two areas obtained by dividing the pickup image with the second axis 6 (or first axis 5) is shifted, with an intersection k of the third axis 7 and the first axis 5 (or second axis 6) as the center, by the amount proportional to the distance from the second axis 6 (or first axis 5) in the direction perpendicular to the second axis 6 (or first axis 5) so that the third axis 7 and the second axis 6 (or first axis 5) become in parallel with each other. Here, the area on the third axis 7 side of the two areas obtained by dividing the pickup image with the second axis 6 is compressed or extended in the direction perpendicular to the second axis 6.

Figure 17:
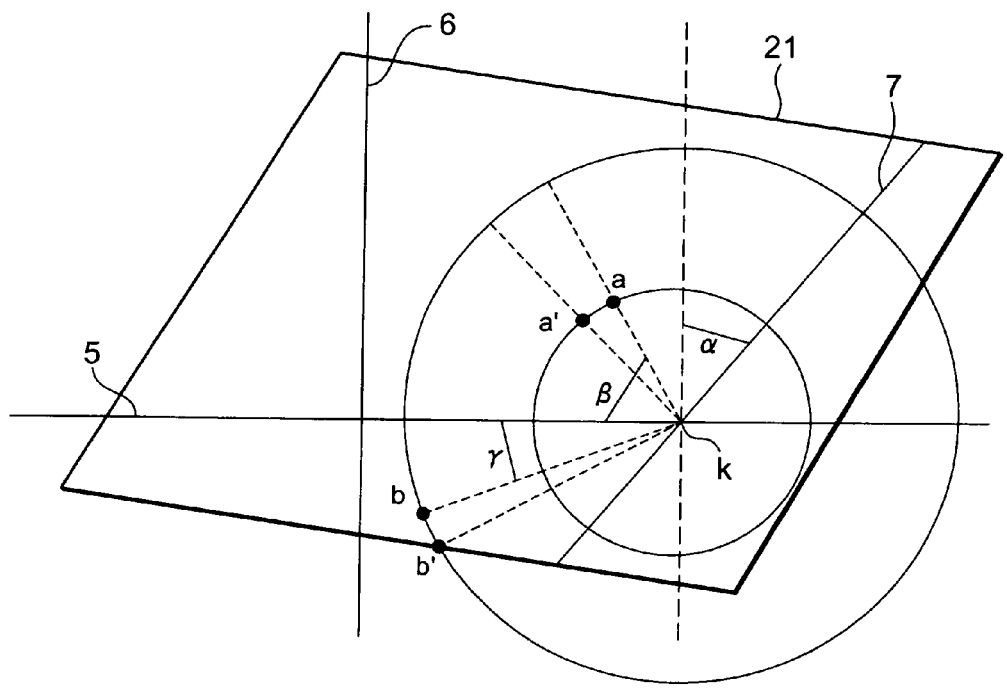
FIG. 17 is an example of correction performed by the rotation in the third distortion correction process according to the one embodiment of the present invention.

Here, when the pickup image is rotated in this case, an area on the third axis side of two areas obtained by dividing the pickup image with one of the first and second axes that is in parallel with the third axis is rotated about the intersection of the third axis and one of the first and second axes that is perpendicular to the third axis. Here, a more detailed description is given of the rotation of the pickup image with reference to FIG. 17. FIG. 17 is a drawing for describing how the pickup image is rotated in this case. α is set as an angle by which the third axis is rotated. Further, with respect to points a and b of a pickup image 21, β and γ are set as angles between the first axis and straight lines from a point k to points a and b, respectively. The points a and b have only to be rotated by $\alpha*\beta/(90+\alpha)$ and $\alpha*\gamma/(90-\alpha)$, respectively. Positions of the points a and b after the rotation are denoted by a' and b', respectively.

(Case 3 for Third Distortion Correction Process: the Third Axis is in Parallel with One of the First and Second Axes, and is Perpendicular to the Other)

In the third axis correction, in a case where the first axis and the second axis are perpendicular to each other and where the third axis does not intersect with the first axis or the second axis in the pickup image, the selection is made as to whether the third axis is made in parallel with the first axis (or second axis) or is made perpendicular to the first axis (or second axis). In the case where the third axis is made in parallel with the first axis (or second axis), an area on the third axis side of two areas obtained by dividing the pickup image with the first axis (or second axis) is shifted, with one of the intersections of the third axis and the boundaries of the pickup image which is the closer to the first axis (or second axis) as the center, by the amount proportional to the distance from the first axis (or second axis) in the direction perpendicular to the first axis (or second axis) so that the third axis and the first axis (or second axis) become in parallel with each other. Here, the area on the third axis side of the two areas obtained by dividing the pickup image with the first axis (or second axis) is compressed or extended in the direction perpendicular to the first axis.

In the case where the third axis is made perpendicular to the first axis (or second axis), an area on the third axis side of two areas obtained by dividing the pickup image with the second axis (or first axis) is shifted, with one of the intersections of the third axis and the boundaries of the pickup image which is the closer to the second axis (or first axis) as the center, by the amount proportional to the distance from the second axis (or first axis) in the direction perpendicular to the second axis (or first axis) so that the third axis and the second axis (or first axis) become in parallel with each other. Here, the area on the third axis side of the two areas obtained by dividing the pickup image with the second axis (or first axis) is compressed or extended in the direction perpendicular to the second axis.

The above-mentioned case 3 for the third distortion correction process is the same as the case 2 for the third distortion correction process in that the axis that is in parallel with one of the first and second axes and is perpendicular to the other on the design image is specified as the third axis on the pickup image, and that, when one of the first and second axes that is in parallel with the third axis on the design image is determined as a parallel axis, an area on the third axis side of two areas obtained by dividing the pickup image with the parallel axis is shifted, with one point on the third axis fixed, in proportion to the distance from the parallel axis in the direction perpendicular to the parallel axis so that the third axis becomes in parallel with the parallel axis. The differences between the case 2 and the case 3 are merely which of the first and second axes is to be determined as the parallel axis, and where the center (fixed point) of the third axis is to be set when the pickup image is shifted. With the third distortion correction described above, when the distortion is reduced to an extent that presents no problem for practical application, the distortion correction may be ended after the third axis correction.

(Fourth Distortion Correction Process)

Figure 11A:
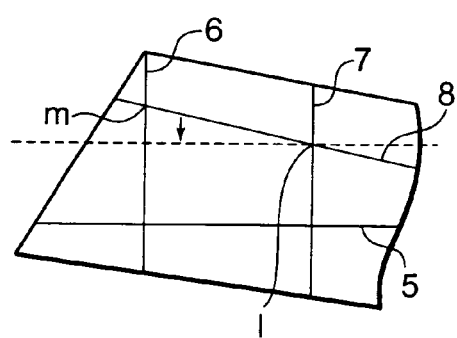
FIGS. 11A and 11B are an example of a fourth distortion correction process according to the one embodiment of the present invention.
Figure 11B:
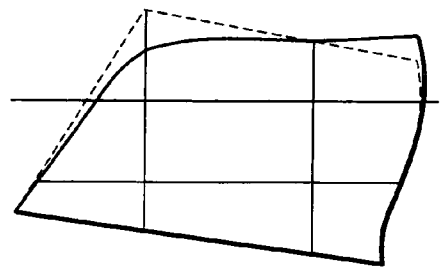

In fourth axis correction, as illustrated in FIGS. 11A and 11B, with any one of the intersections of a fourth correction axis 8 (hereinbelow, referred to as fourth axis) and two axes which, among the first axis 5 to the third axis 7, have correction axes in parallel with each other as the center, an area on the fourth axis 8 side of two areas obtained by dividing the pickup image with the axis which, among the first to third axes, does not have a correction axis in parallel with the other axes (hereinbelow, referred to as opposing axis), is shifted by the amount proportional to the distance from the opposing axis in the direction perpendicular to the opposing axis so that the fourth axis and the opposing axis become in parallel with each other. With this shift, the area on the fourth axis side of the two areas obtained by dividing the pickup image with the opposing axis of the pickup image is compressed or extended in the direction perpendicular to the opposing axis. Further, also in the fourth shift, instead of the parallel shift, it is possible to select the rotational shift or use both the parallel shift and the rotational shift in combination. In the case of the rotation, an area that is on the fourth axis side of the two areas obtained by dividing the pickup image with the opposing axis, and that is sandwiched between the two axes perpendicular to the opposing axis, has only to be rotated about the intersection of the fourth axis and the axis intersecting with the fourth axis.

With the processing described above, even if the image becomes blurry when photographed or distorted compared to the real image, it is possible to easily correct a portion surrounded by four correction axes at most into a rectangle.

[Modification Examples of First Embodiment]

The distortion correction process according to the first embodiment of the present invention can be modified in various manners. Particularly, the third distortion correction process and the fourth distortion correction process can be modified as follows.

(Modification Example of Case 2 for Third Distortion Correction Process)

In the third axis correction, in a case where the first axis and the second axis are perpendicular to each other and where the third axis intersects with the first axis (or second axis) in the pickup image, the area on the third axis side of the two areas obtained by dividing the pickup image with the second axis (or first axis) may be shifted, with any one of the intersections of the third axis and the boundaries of the pickup image as the center, by the amount proportional to the distance from the second axis (or first axis) in the direction perpendicular to the second axis (or first axis) so that the third axis and the second axis (or first axis) become in parallel with each other. In the case 2 for the third distortion correction process described with reference to FIGS. 9A and 9B, the pickup image is shifted with the intersection of the first axis and the third axis as the center. However, this modification example is different in that the pickup image is shifted with the intersection of the third axis and the boundary of the pickup image as the center. Those cases are merely different as to which point on the third axis is to be fixed (used as the center) to shift the pickup image. In this case as well, it is possible to easily correct a portion surrounded by the correction axes into a rectangle.

(Modification Example 1 of Case 3 for Third Distortion Correction Process)

In the third axis correction, in a case where the first axis and the second axis are perpendicular to each other and where the third axis does not intersect with the first axis or the second axis in the pickup image, selection is made as to whether the third axis is to be made in parallel with the first axis (or second axis) or made perpendicular to the first axis (or second axis).

In the case where the third axis is made in parallel with the first axis (or second axis), the area on the third axis side of the two areas obtained by dividing the pickup image with the first axis (or second axis) is shifted, with one of the intersections of the third axis and the boundaries of the pickup image which is the farther from the first axis (or second axis) as the center, by the amount proportional to the distance from the first axis (or second axis) in the direction perpendicular to the first axis (or second axis) so that the third axis and the first axis (or second axis) become in parallel with each other. In the case 3 for the third distortion correction process, the pickup image is shifted with the closer intersection as the center. However, this modification example is different in that the pickup image is shifted with the farther intersection as the center.

In the case where the third axis is made perpendicular to the first axis (or second axis), the area on the third axis side of the two areas obtained by dividing the pickup image with the second axis (or first axis) is shifted, with one of the intersections of the third axis and the boundaries of the pickup image which is the farther from the second axis (or first axis) as the center, by the amount proportional to the distance from the second axis (or first axis) in the direction perpendicular to the second axis (or first axis) so that the third axis and the second axis (or first axis) become in parallel with each other. In the case 3 for the third distortion correction process, the pickup image is parallel-shifted with the closer intersection as the center. However, this modification example is different in that the pickup image is parallel-shifted with the farther intersection as the center. In this case as well, it is possible to easily correct a portion surrounded by the correction axes into a rectangle.

(Modification Example 2 of Case 3 for Third Distortion Correction Process)

According to another modification example, in the third axis correction, in the case where the first axis and the second axis are perpendicular to each other and where the third axis does not intersect with the first axis or the second axis in the pickup image, any one of the intersections of the third axis and the boundaries of the pickup image is selected.

In a case where the distance between the selected intersection and the first axis (or second axis) is smaller than the distance between the intersection that has not been selected and the first axis (or second axis), the area on the third axis side of the two areas obtained by dividing the pickup image with the first axis (or second axis) is shifted, with the selected intersection as the center, by the amount proportional to the distance from the first axis (or second axis) in the direction perpendicular to the first axis (or second axis) so that the third axis and the first axis (or second axis) become in parallel with each other.

In a case where the distance between the selected intersection and the first axis (or second axis) is larger than the distance between the intersection that has not been selected and the first axis (or second axis), the area on the third axis side of the two areas obtained by dividing the pickup image with the second axis (or first axis) is shifted, with the selected intersection as the center, by the amount proportional to the distance from the second axis (or first axis) in the direction perpendicular to the second axis (or first axis) so that the third axis and the second axis (or first axis) become in parallel with each other.

Specifically, in this modification example 2 of the case 3 for the third axis correction, when the intersection closer to the first axis is selected from the intersections of the third axis and the boundaries of the pickup image, the correction is made so that the third axis becomes in parallel with the first axis. When the farther intersection is selected, the correction is made so that the third axis becomes in parallel with the second axis.

In this case as well, it is possible to easily correct a portion surrounded by the correction axes into a rectangle.

(Modification Example 3 of Case 3 for Third Distortion Correction Process)

According to yet another modification example, in the third axis correction, in the case where the first axis and the second axis are perpendicular to each other and where the third axis does not intersect with the first axis or the second axis in the pickup image, any one of the intersections of the third axis and the boundaries of the pickup image is selected.

In the case where the distance between the selected intersection and the first axis (or second axis) is larger than the distance between the intersection that has not been selected and the first axis (or second axis), the area on the third axis side of the two areas obtained by dividing the pickup image with the first axis (or second axis) is shifted, with the selected intersection as the center, by the amount proportional to the distance from the first axis (or second axis) in the direction perpendicular to the first axis (or second axis) so that the third axis and the first axis (or second axis) become in parallel with each other.

In the case where the distance between the selected intersection and the first axis (or second axis) is smaller than the distance between the intersection that has not been selected and the first axis (or second axis), the area on the third axis side of the two areas obtained by dividing the pickup image with the second axis (or first axis) is shifted, with the selected intersection as the center, by the amount proportional to the distance from the second axis (or first axis) in the direction perpendicular to the second axis (or first axis) so that the third axis and the second axis (or first axis) become in parallel with each other.

Specifically, in this modification example 3 of the case 3 for the third axis correction, when the intersection farther from the first axis is selected from the intersections of the third axis and the boundaries of the pickup image, the correction is made so that the third axis becomes in parallel with the first axis. When the closer intersection is selected, the correction is made so that the third axis becomes in parallel with the second axis.

In this case as well, it is possible to easily correct a portion surrounded by the correction axes into a rectangle.
(Modification Example of Fourth Distortion Correction Process)

Further, according to another modification example of the first embodiment, in the fourth distortion correction process, the area on the fourth axis side of the two areas obtained by dividing the pickup image with the opposing axis is shifted, with any one of the intersections of the fourth axis and the boundaries of the pickup image as the center, by the amount proportional to the distance from the opposing axis in the direction perpendicular to the opposing axis so that the fourth axis and the opposing axis become in parallel with each other. Specifically, in this modification example of the fourth distortion correction process, the inclination of the fourth axis is corrected with the intersection of the fourth axis and the boundary of the pickup image as the center, instead of the intersection of the fourth axis and another axis. In this case as well, it is possible to easily correct a portion surrounded by the correction axes into a rectangle.

Second Embodiment

Next, a description is given of an embodiment in which a display device according to the present invention includes a computer, which is caused to execute a display method of the present invention, and an embodiment of a program that causes a computer to function as the above-mentioned display device.

Figure 2A:
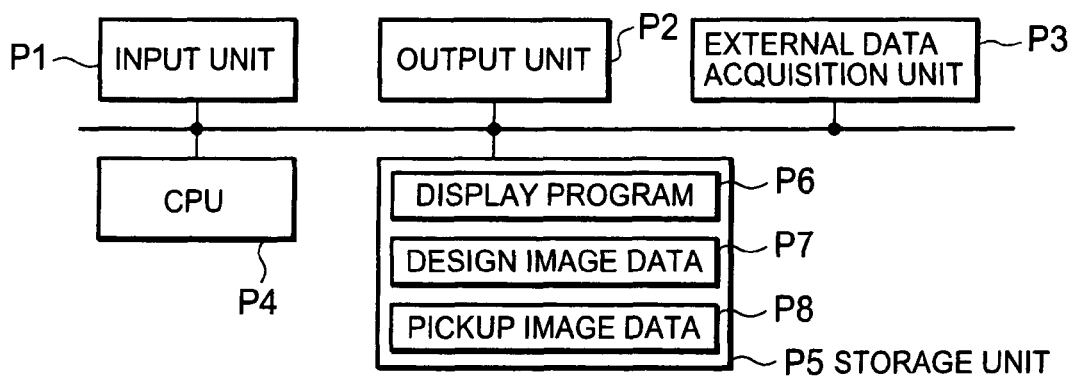
FIG. 2A is a block diagram for the present invention.

FIG. 2A is a block diagram for a case in which the display device according to the present invention is configured using a computer. The display device according to the second embodiment of the present invention includes an external data acquisition unit P3 for externally acquiring a design image and a pickup image, a CPU P4, an input unit P1 for inputting an instruction to execute displaying of the design image and the pickup image in a superimposing manner, an output unit P2, and a storage unit P5. Other than such a main memory as a cache or a semiconductor memory, the storage unit P5 may include an auxiliary storage device, for example, a magnetic storage medium such as a hard disk or an optical storage medium such as a CD or a DVD.

The storage unit P5 stores a display program P6 for causing the CPU P4 to execute the distortion correction process of correcting the distortion of the pickup image, the alignment process of aligning the position of the design image with the position of the pickup image, and the display process of displaying the design image and the pickup image in a superimposing manner, which are described in the first embodiment of the present invention. Further, design image data P7 and pickup image data P8 that are externally acquired are also stored in the storage unit P5.

When the correction axes are specified in the distortion correction processing and the alignment points are specified in the position alignment processing, the cross cursors that are lines in parallel with the horizontal and vertical directions of the design image are displayed in the output unit P2. Further, the design image and the pickup image are displayed in a superimposing manner. The input unit P1, the CPU P4, the storage unit P5, the external data acquisition unit P3, and the output P2 are connected to one another via bus lines.

In the second embodiment of the present invention, in accordance with the display program P6, the CPU P4 performs the processing of the distortion correction process based on coordinate data of four points or the coordinates of four axes specified by the operator via the input unit P1, and then updates the pickup image data P8. Further, in accordance with the display program P6, the CPU P4 performs the processing of the alignment process based on alignment coordinate data specified by the operator via the input unit P1, and then updates the design image data P7 and the pickup image data P8. Further, in accordance with the display program P6, the CPU P4 displays the updated design image data P7 and pickup image data P8 on the display of the computer via the output unit P2, thereby performing the processing of the display process. The processing contents of the distortion correction process, the alignment process, and the display process are the same as those of the first embodiment of the present invention.

It should be noted that, in the above-mentioned processing of updating the design image data P7 and the pickup image data P8, data before the update may be left on the computer, or may be deleted from the computer if the data is unnecessary any more.

Further, the computer installed with the above-mentioned display program functions as the display device that includes a distortion correction unit, an alignment unit, and a display unit. This computer may be a general-use engineering workstation or personal computer that is provided with an output unit such as a display, an input unit such as a mouse or a keyboard, an auxiliary storage device such as a DVD or a CD-ROM, and an external interface function such as Internet connection. Further, the above-mentioned display program can be installed onto the above-mentioned computer via such storage media as a semiconductor memory, a magnetic storage device, and an optical storage device, or via the Internet.

Figure 2B:
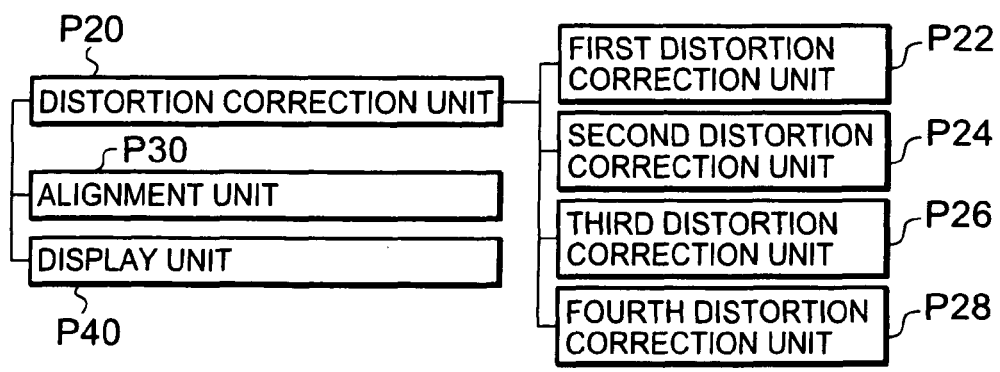
FIG. 2B is a functional block diagram for the present invention.

FIG. 2B shows a functional block diagram of a display device that displays a design image and a pickup image in a superimposing manner for this invention. The display device includes a distortion correction unit P20, an alignment unit P30 and a display unit P40. The distortion correction unit P20 further includes a first distortion correction unit P22, a second distortion correction unit P24, a third distortion correction unit P26 and a fourth distortion correction unit P28. The first distortion correction unit P22 performs the first distortion correction process mentioned above. The second distortion correction unit P 24 performs the second distortion correction process mentioned above. The third distortion correction unit P26 performs the third distortion correction process mentioned above. The fourth distortion correction unit P28 performs the fourth distortion correction process mentioned above. The alignment unit P30 performs the alignment process of aligning the positions of the design image and the pickup image mentioned above. The display unit P40 performs the display process of displaying the design image and the pickup image in a superimposing manner mentioned above. The above four distortion correction units may be performed sequentially from the first distortion correction unit to the fourth distortion correction unit.

As has been described above, according to the above-mentioned embodiments, for example, in failure analysis of an LSI, even if the image becomes blurry when photographed or is distorted compared to the real image, axes that are desired to be made vertical or horizontal with respect to the coordinate system of the layout are specified in the analysis image, and then, the specified axes are corrected to be in the directions of the coordinate axes of the layout. The wiring and gates of the LSI are basically arranged vertically or horizontally with respect to the coordinate axes of the layout, and hence the analyst can easily specify the correction axes.

Further, three points are respectively specified in the layout image and the analysis image in a corresponding manner, and then it is automatically judged whether or not the analysis image is reversed front to back with respect to the layout image based on the three points of the layout image and the three points of the analysis image. Hence, regardless of whether the analysis image (pickup image) is photographed from the front side or the back side, the layout (design image) can be automatically corrected to become in the same direction as that of the analysis image.

Further, according to the above-mentioned embodiments, in the failure analysis of the LSI, when it is found that a physical abnormality discovered by an analysis device has caused a logical abnormality, the discovered physical abnormality can be determined as a cause of the failure of the LSI. Accordingly, owing to the fact that the layout image displaying candidates for the logical failure and the analysis image obtained by the analysis device can be easily superimposed over each other, it becomes easy to specify a location of the failure.

Hereinabove, the present invention has been described with reference to embodiments thereof, but is not limited to the configurations of the above-mentioned embodiments. It is understood that the present invention includes all such variations and modifications that one skilled in the art could attain within the scope of the present invention.

For example, the distortion correction process may be performed by specifying three points in the pickup image, and correcting the pickup image so that a triangle formed by the three points becomes a right-angled triangle. Further, the distortion correction process also may be performed by specifying a triangle in the pickup image, and correcting the pickup image so that the triangle becomes a right-angled triangle.

What is claimed is:

1. A display method of displaying a design image and a pickup image in a superimposing manner, comprising:
   a distortion correction process of correcting distortion of the pickup image so that a quadrangle formed by connecting four points on the pickup image becomes a rectangle in parallel with a vertical axis and a horizontal axis, the four points on the pickup image being corresponding to four points on the design image connected to form the rectangle in parallel with the vertical axis and the horizontal axis;
   an alignment process of aligning a position of the design image with a position of the pickup image by carrying out at least one of right-left reversal, top-bottom reversal, shift, rotation, enlargement, and reduction, with respect to at least one of the design image and the pickup image; and
   a display process of displaying the design image and the pickup image in the superimposing manner.

2. The display method according to claim 1, wherein the distortion correction process comprises specifying, on the pickup image, two axes that are in parallel with the vertical axis on the design image and two axes that are in parallel with the horizontal axis on the design image, and then specifying the four points with a quadrangle sectioned by the four axes.

3. The display method according to claim 1, wherein the distortion correction process comprises a first distortion correction process in which a first axis that is in parallel with one of the vertical axis and the horizontal axis on the design image is specified on the pickup image, and the pickup image is rotated so that the first axis becomes in parallel with the one of the vertical axis and the horizontal axis.

4. The display method according to claim 3, wherein the distortion correction process further comprises a second distortion correction process in which a second axis that is perpendicular to the first axis on the design image is specified on the pickup image, and the pickup image is parallel-shifted in a direction in parallel with the first axis so that the second axis becomes perpendicular to the first axis on the pickup image, and/or the pickup image is rotated, with an intersection of the first axis and the second axis as a center, so that the second axis becomes perpendicular to the first axis on the pickup image.

5. The display method according to claim 3, wherein the distortion correction process comprises a second distortion correction process in which a second axis that is in parallel with the first axis on the design image is specified on the pickup image, and an area on a second axis side of two areas obtained by dividing the pickup image with the first axis is shifted, with one point on the second axis fixed, in proportion to a distance from the first axis in a direction perpendicular to the first axis so that the second axis becomes in parallel with the first axis on the pickup image.

6. The display method according to claim 5, wherein the distortion correction process comprises a third distortion correction process in which a third axis that is perpendicular to the first axis and the second axis on the design image is specified on the pickup image, and the pickup image is parallel-shifted in a direction in parallel with the first axis so that the third axis becomes perpendicular to the first axis on the pickup image, and/or the pickup image is rotated, with an intersection of the first axis and the third axis as a center, so that the third axis becomes perpendicular to the first axis on the pickup image.

7. The display method according to claim 4, wherein the distortion correction process comprises a third distortion correction process in which a third axis that is in parallel with one of the first axis and the second axis and is perpendicular to another one of the first axis and the second axis on the design image is specified on the pickup image, and, when the one of the first axis and the second axis, which is in parallel with the third axis on the design image, is determined as a parallel axis, an area on a third axis side of two are as obtained by dividing the pickup image with the parallel axis is shifted, with one point on the third axis fixed, in proportion to a distance from the parallel axis in a direction perpendicular to the parallel axis so that the third axis becomes in parallel with the parallel axis on the pickup image.

8. The display method according to claim 6, wherein the distortion correction process comprises a fourth distortion correction process in which a fourth axis is specified on the pickup image, the fourth axis sectioning the rectangle in parallel with the vertical axis and the horizontal axis along with the first axis, the second axis, and the third axis, and, when one of the first axis, the second axis, and the third axis, which is in parallel with the fourth axis on the design image, is determined as an opposing axis, an area on a fourth axis side of two areas obtained by dividing the pickup image with the opposing axis is shifted, with one point on the fourth axis fixed, in proportion to a distance from the opposing axis in a direction perpendicular to the opposing axis so that the fourth axis becomes in parallel with the opposing axis.

9. The display method according to claim 1, wherein the alignment process comprises
   judging whether or not the pickup image is reversed front to back with respect to the design image based on three points specified on the design image and three points specified on the pickup image in a corresponding manner thereto, and
   correcting, when the pickup image is reversed front to back with respect to the design image, the front-back reversal by carrying out one of the right-left reversal and the top-bottom reversal with respect to one of the design image and the pickup image.

10. The display method according to claim 9, wherein the alignment process comprises
- comparing order in which the three points are specified on the design image with order in which the three points are specified on the pickup image,
- judging whether the three points are specified in clockwise order or in counterclockwise order, and
- correcting, when the three points are specified in different order between the design image and the pickup image, the front-back reversal by carrying out the one of the right-left reversal and the top-bottom reversal with respect to the one of the design image and the pickup image.

11. A display device that displays a design image and a pickup image in a superimposing manner, comprising:
- a distortion correction unit for correcting distortion of the pickup image so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis;
- an alignment unit for aligning a position of the design image with a position of the pickup image by carrying out at least one of right-left reversal, top-bottom reversal, shift, rotation, enlargement, and reduction, with respect to at least one of the design image and the pickup image; and
- a display unit for displaying the design image and the pickup image in the superimposing manner.

12. The display device according to claim 11, wherein the distortion correction unit specifies, on the pickup image, two axes that are in parallel with the vertical axis on the design image and two axes that are in parallel with the horizontal axis on the design image, and then specifies the four points with a quadrangle sectioned by the four axes.

13. The display device according to claim 11, wherein the distortion correction unit comprises a first distortion correction unit that specifies, on the pickup image, a first axis that is in parallel with one of the vertical axis and the horizontal axis on the design image, and rotates the pickup image so that the first axis becomes in parallel with the one of the vertical axis and the horizontal axis.

14. The display device according to claim 13, wherein the distortion correction unit comprises
- a second distortion correction unit that specifies, on the pickup image, a second axis that is perpendicular to the first axis on the design image, and parallel-shifts the pickup image in a direction in parallel with the first axis so that the second axis becomes perpendicular to the first axis on the pickup image, and/or rotates the pickup image, with an intersection of the first axis and the second axis as a center, so that the second axis becomes perpendicular to the first axis on the pickup image.

15. The display device according to claim 13, wherein the distortion correction unit comprises a second distortion correction unit that specifies, on the pickup image, a second axis that is in parallel with the first axis on the design image, and shifts an area on a second axis side of two areas obtained by dividing the pickup image with the first axis, with one point on the second axis fixed, in proportion to a distance from the first axis in a direction perpendicular to the first axis so that the second axis becomes in parallel with the first axis on the pickup image.

16. The display device according to claim 15, wherein the distortion correction unit comprises a third distortion correction unit that specifies, on the pickup image, a third axis that is perpendicular to the first axis and the second axis on the design image, and parallel-shifts the pickup image in a direction in parallel with the first axis so that the third axis becomes perpendicular to the first axis on the pickup image, and/or rotates the pickup image, with an intersection of the first axis and the third axis as a center, so that the third axis becomes perpendicular to the first axis on the pickup image.

17. The display device according to claim 14, wherein the distortion correction unit comprises a third distortion correction unit that specifies, on the pickup image, a third axis that is in parallel with one of the first axis and the second axis and is perpendicular to another one of the first axis and the second axis on the design image, and, when the one of the first axis and the second axis, which is in parallel with the third axis on the design image, is determined as a parallel axis, shifts an area on a third axis side of two areas obtained by dividing the pickup image with the parallel axis, with one point on the third axis fixed, in proportion to a distance from the parallel axis in a direction perpendicular to the parallel axis so that the third axis becomes in parallel with the parallel axis on the pickup image.

18. The display device according to claim 16, wherein the distortion correction unit comprises a fourth distortion correction unit that specifies a fourth axis on the pickup image, the fourth axis sectioning the rectangle in parallel with the vertical axis and the horizontal axis along with the first axis, the second axis, and the third axis on the design image, and, when one of the first axis, the second axis, and the third axis, which is in parallel with the fourth axis on the design image, is determined as an opposing axis, shifts an area on a fourth axis side of two areas obtained by dividing the pickup image with the opposing axis, with one point on the fourth axis fixed, in proportion to a distance from the opposing axis in a direction perpendicular to the opposing axis so that the fourth axis becomes in parallel with the opposing axis.

19. The display device according to claim 11, wherein the alignment unit judges whether or not the pickup image is reversed front to back with respect to the design image based on three points specified on the design image and three points specified on the pickup image in a corresponding manner thereto, and corrects, when the pickup image is reversed front to back with respect to the design image, the front-back reversal by carrying out one of the right-left reversal and the top-bottom reversal with respect to one of the design image and the pickup image.

20. A storage medium storing a program for causing a computer to execute a display method of displaying a design image and a pickup image in a superimposing manner, the display method comprising:
- a distortion correction process of correcting distortion of the pickup image so that a quadrangle formed by connecting four points on the pickup image becomes a rectangle in parallel with a vertical axis and a horizontal axis, the four points specified on the pickup image corresponding to four points on the design image which are connected to form a rectangle in parallel with the vertical axis and the horizontal axis;
- an alignment process of aligning a position of the design image with a position of the pickup image by carrying out at least one of right-left reversal, top-bottom reversal, shift, rotation, enlargement, and reduction, with respect to at least one of the design image and the pickup image; and
- a display process of displaying the design image and the pickup image in the superimposing manner.

* * * * *